United States Patent [19]  
Drewry

[11] Patent Number: 5,000,860  
[45] Date of Patent: Mar. 19, 1991

[54] METHOD FOR DEWATERING ALUM SLUDGE

[75] Inventor: William A. Drewry, Virginia Beach, Va.

[73] Assignees: Center for Innovative Technology, Herndon; Old Dominion University, Norfolk, both of Va.

[21] Appl. No.: 563,929

[22] Filed: Aug. 7, 1990

[51] Int. Cl.⁵ .............................................. C02F 1/72
[52] U.S. Cl. .................... 210/721; 210/759; 210/912
[58] Field of Search ............... 210/759, 721, 912, 767, 210/787, 807, 808

[56] References Cited

U.S. PATENT DOCUMENTS

| 3,530,067 | 9/1970 | Friedman | 210/759 |
| 3,720,608 | 3/1973 | Stauffer | 210/710 |
| 4,051,027 | 9/1977 | Batzer et al. | 210/721 |
| 4,219,418 | 8/1980 | Pilon | 210/717 |
| 4,221,661 | 9/1980 | Shimizu et al. | 210/759 |
| 4,244,818 | 1/1981 | Abson | 210/758 |

FOREIGN PATENT DOCUMENTS

| 41797 | 12/1971 | Japan | 210/759 |
| 112557 | 9/1979 | Japan | 210/759 |

Primary Examiner—Stanley Silverman  
Assistant Examiner—Neil M. McCarthy  
Attorney, Agent, or Firm—Whitham & Marhoefer

[57] ABSTRACT

The dewaterability of alum sludge is improved by treating the alum sludge with low doses of hydrogen peroxide. The hydrogen peroxide enhances filterability and drainability of the alum sludge and also improves the resulting cake quality of the dewatered alum sludge.

18 Claims, 21 Drawing Sheets

CAPILLARY SUCTION TIMES (CST) FOR SLUDGE SAMPLES  
BEFORE AND AFTER HYDROGEN PEROXIDE ADDITION

| SAMPLE | INITIAL CST (sec) PRIOR TO TESTING | CST (sec) AFTER $H_2O_2$ AND 5% CARRIER WATER ADDITION $H_2O_2$ mg/L | | | |
|---|---|---|---|---|---|
| | | 0 | 2.5 | 7.5 | 15.0 |
| A NORFOLK | 300.80 | 300.50 | 296.00 | 282.70 | 250.25 |
| B NORFOLK | 250.30 | 250.10 | 248.30 | 235.28 | 215.34 |
| C NEWPORT NEWS | 50.10 | 50.00 | 40.00 | 30.60 | 20.70 |
| D PORTSMOUTH | 38.80 | 38.60 | 38.00 | 30.20 | 20.50 |
| E CHESAPEAKE | 110.20 | 110.00 | 107.00 | 90.10 | 62.40 |

FIG. 2  SLUDGE CHARACTERISTICS

| SLUDGE SAMPLE | INITIAL SOLID CONCENTRATION (Co) (PERCENT) | pH | ALKALINITY mg/L AS $CaCO_3$ | VOLATIVE SOLIDS CONCENTRATION PERCENT TOTAL |
|---|---|---|---|---|
| A NORFOLK | 3.04 | 6.43 | 1375.00 | 54.92 |
| B NORFOLK | 4.03 | 6.36 | 1015.00 | 38.92 |
| C NEWPORT NEWS | 0.95 | 6.39 | 364.40 | 38.82 |
| D PORTSMOUTH | 0.78 | 6.57 | 386.66 | 29.40 |
| E CHESAPEAKE | 2.26 | 5.80 | 438.00 | 40.38 |

FIG. 3 METAL ANALYSIS OF RAW SLUDGE SAMPLES
| SAMPLE | ALUMINUM Al mg/L | IRON Fe mg/L | MANGANESE Mn mg/L |
|---|---|---|---|
| A NORFOLK | 17,000 | 25,000 | 1,500 |
| B NORFOLK | 17,200 | 31,000 | 1,200 |
| C NEWPORT NEWS | 10,000 | 39,000 | 800 |
| D PORTSMOUTH | 11,000 | 28,000 | 1,300 |
| E CHESAPEAKE | 13,500 | 29,200 | 1,320 |
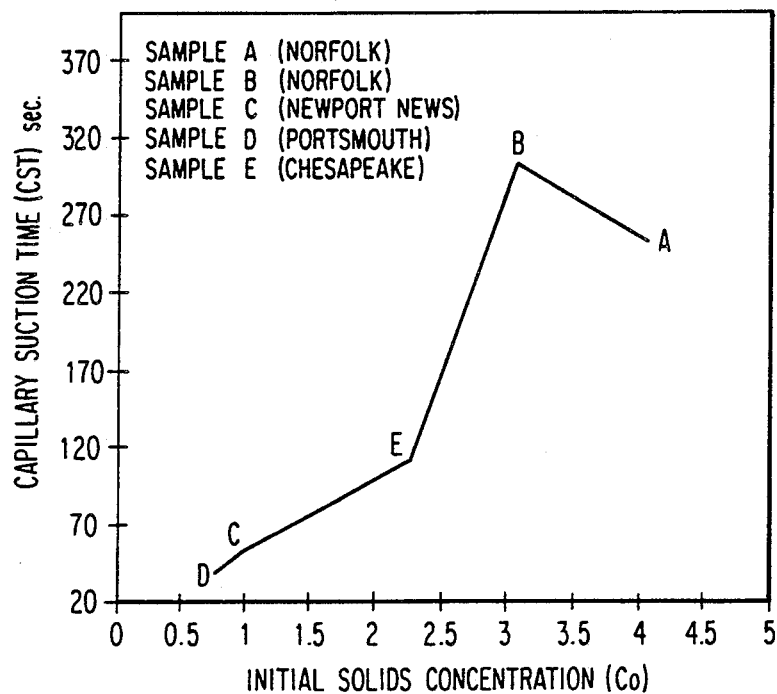
FIG. 4 CAPILLARY SUCTION TIME AS A FUNCTION OF INITIAL SOLIDS CONCENTRATION ($C_o$)

FIG. 5  CAPILLARY SUCTION TIMES (CST) FOR SLUDGE SAMPLES BEFORE AND AFTER HYDROGEN PEROXIDE ADDITION

| SAMPLE | INITIAL CST (sec) PRIOR TO TESTING | CST (sec) AFTER $H_2O_2$ AND 5% CARRIER WATER ADDITION $H_2O_2$ mg/L | | | |
|---|---|---|---|---|---|
| | | 0 | 2.5 | 7.5 | 15.0 |
| A NORFOLK | 300.80 | 300.50 | 296.00 | 282.70 | 250.25 |
| B NORFOLK | 250.30 | 250.10 | 248.30 | 235.28 | 215.34 |
| C NEWPORT NEWS | 50.10 | 50.00 | 40.00 | 30.60 | 20.70 |
| D PORTSMOUTH | 38.80 | 38.60 | 38.00 | 30.20 | 20.50 |
| E CHESAPEAKE | 110.20 | 110.00 | 107.00 | 90.10 | 62.40 |

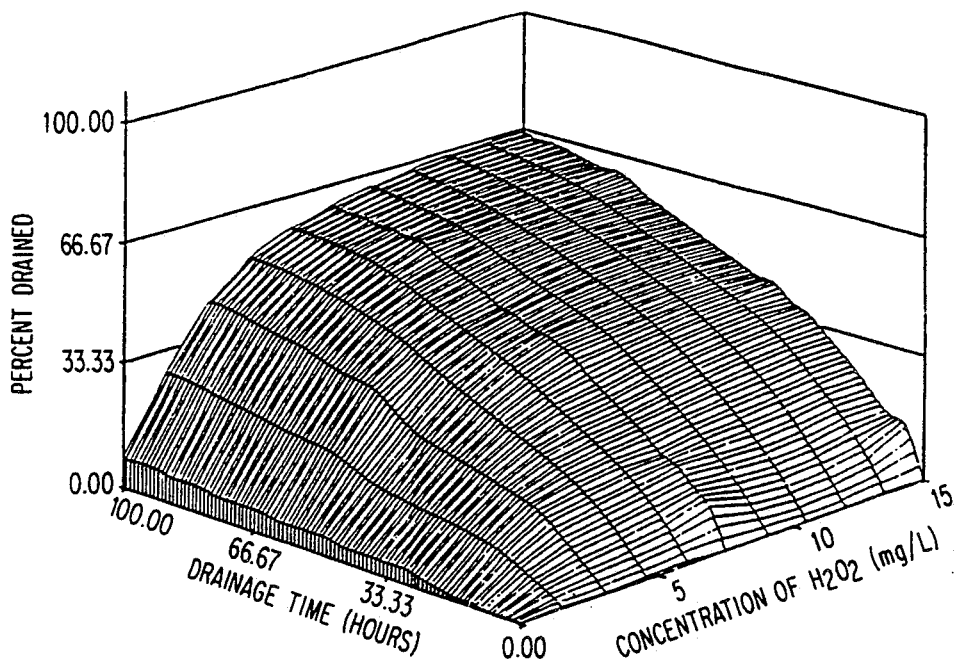
FIG. 7  VARIATION OF PERCENT DRAINAGE WITH HYDROGEN PEROXIDE CONCENTRATION AND DRAINAGE TIME: SAMPLE A (NORFOLK)
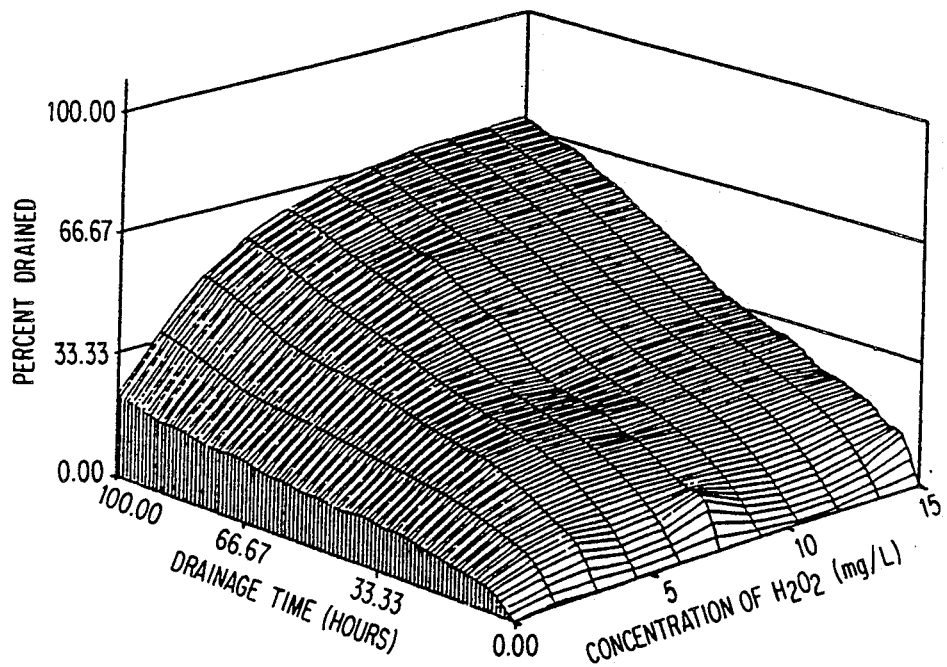
FIG. 8  VARIATION OF PERCENT DRAINAGE WITH HYDROGEN PEROXIDE CONCENTRATION AND DRAINAGE TIME: SAMPLE B (NORFOLK)

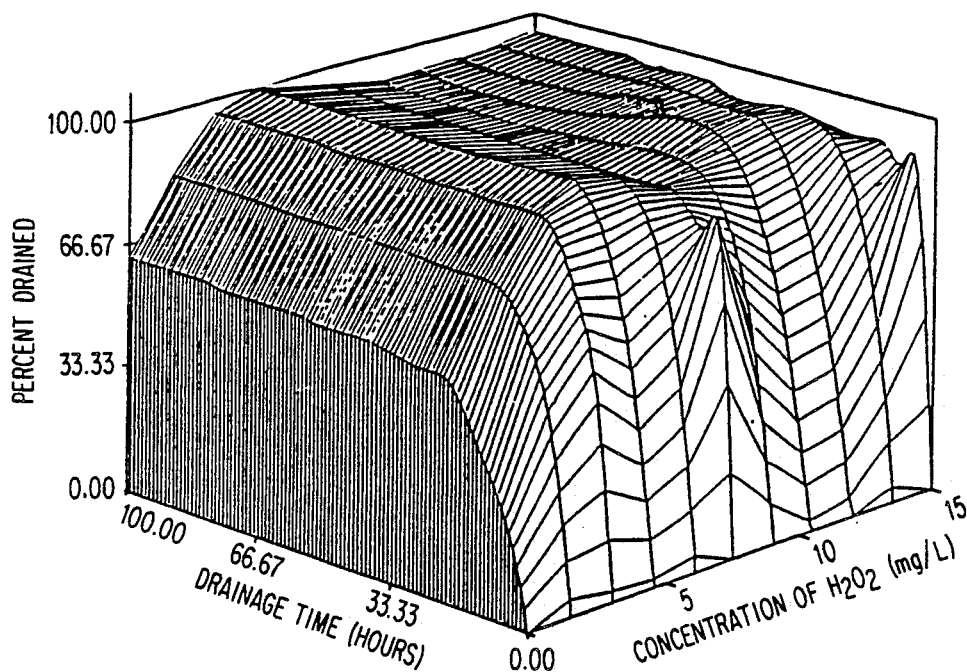
FIG. 9 VARIATION OF PERCENT DRAINAGE WITH HYDROGEN PEROXIDE CONCENTRATION AND DRAINAGE TIME: SAMPLE C (NEWPORT NEWS)
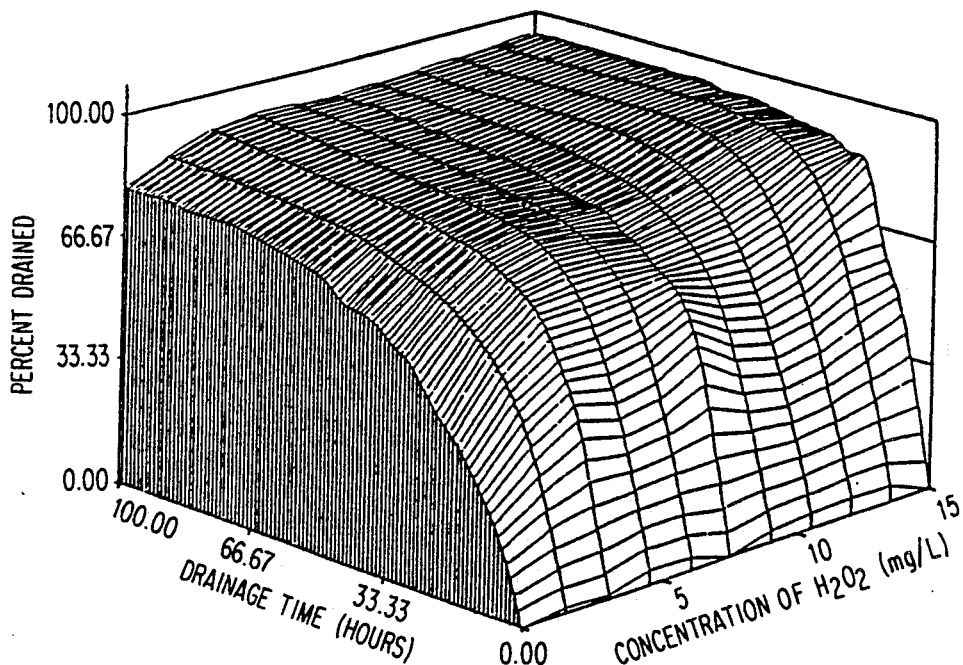
FIG. 10 VARIATION OF PERCENT DRAINAGE WITH HYDROGEN PEROXIDE CONCENTRATION AND DRAINAGE TIME: SAMPLE D (PORTSMOUTH)

FIG. 11  VARIATION OF PERCENT DRAINAGE WITH HYDROGEN PEROXIDE CONCENTRATION AND DRAINAGE TIME: SAMPLE E (CHESAPEAKE)
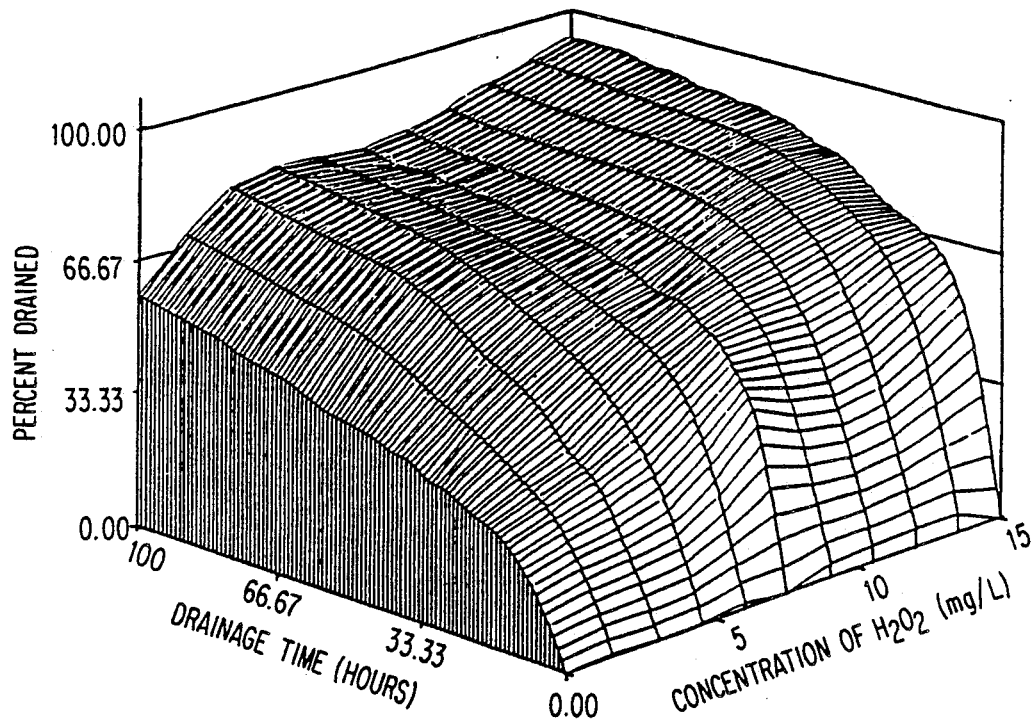
FIG. 12  CAKE SOLIDS CONCENTRATIONS (CK): SAND BED TESTS
| SLUDGE SAMPLE | HYDROGEN PEROXIDE CONCENTRATION mg/L | | | |
|---|---|---|---|---|
| | 0 | 2.5 | 7.5 | 15 |
| A NORFOLK | 4.00 | 10.80 | 15.10 | 19.15 |
| B NORFOLK | 5.82 | 10.34 | 18.52 | 22.43 |
| C NEWPORT NEWS | 4.12 | 6.57 | 15.16 | 17.15 |
| D PORTSMOUTH | 3.10 | 7.10 | 9.66 | 14.00 |
| E CHESAPEAKE | 5.80 | 10.28 | 12.31 | 18.10 |

SCHEMATIC OF BUCHNER FUNNEL TEST

FIG. 14a
EXPERIMENTAL

| H₂O₂ CONCENTRATION mg/L | VACUUM PRESSURE (in. of Hg) | | |
|---|---|---|---|
| | 10 | 15 | 20 |
| 0 | 15.45 | 21.00 | 22.61 |
| 2.5 | 20.77 | 21.60 | 32.95 |
| 7.5 | 21.70 | 36.10 | 40.67 |
| 15 | 23.44 | 37.14 | 48.58 |

SAMPLE A (NORFOLK)

FIG. 14b
CALCULATED

| VACUUM PRESSURE (in. of Hg) | | |
|---|---|---|
| 10 | 15 | 20 |
| 24.59 | 27.16 | 29.74 |
| 35.19 | 37.76 | 40.33 |
| 39.72 | 42.29 | 44.86 |
| 43.52 | 46.09 | 48.67 |

SAMPLE A (NORFOLK)

FIG. 15a
EXPERIMENTAL

| H₂O₂ CONCENTRATION mg/L | VACUUM PRESSURE (in. of Hg) | | |
|---|---|---|---|
| | 10 | 15 | 20 |
| 0 | 17.45 | 18.28 | 19.70 |
| 2.5 | 24.98 | 47.40 | 29.76 |
| 7.5 | 40.28 | 42.64 | 41.89 |
| 15 | 42.50 | 49.00 | 54.56 |

SAMPLE B (NORFOLK)

FIG. 15b
CALCULATED

| VACUUM PRESSURE (in. of Hg) | | |
|---|---|---|
| 10 | 15 | 20 |
| 26.28 | 29.69 | 33.12 |
| 40.34 | 43.76 | 47.18 |
| 46.36 | 49.76 | 53.19 |
| 51.52 | 54.82 | 58.25 |

SAMPLE B (NORFOLK)

FIG. 16a
EXPERIMENTAL

| H₂O₂ CONCENTRATION mg/L | VACUUM PRESSURE (in. of Hg) | | |
|---|---|---|---|
| | 10 | 15 | 20 |
| 0 | 15.30 | 16.15 | 18.20 |
| 2.5 | 17.12 | 18.00 | 19.52 |
| 7.5 | 19.41 | 20.50 | 20.60 |
| 15 | 22.10 | 26.57 | 24.80 |

SAMPLE C (NEWPORT NEWS)

FIG. 16b
CALCULATED

| VACUUM PRESSURE (in. of Hg) | | |
|---|---|---|
| 10 | 15 | 20 |
| 21.06 | 21.86 | 22.67 |
| 24.37 | 25.18 | 25.98 |
| 25.73 | 26.59 | 27.40 |
| 26.98 | 27.78 | 28.59 |

SAMPLE C (NEWPORT NEWS)

FIG. 17a
EXPERIMENTAL

| $H_2O_2$ CONCENTRATION mg/L | VACUUM PRESSURE (in. of Hg) | | |
|---|---|---|---|
| | 10 | 15 | 20 |
| 0 | 12.01 | 17.18 | 18.47 |
| 2.5 | 13.06 | 15.22 | 15.85 |
| 7.5 | 13.68 | 16.58 | 18.50 |
| 15 | 18.34 | 20.19 | 22.67 |

SAMPLE D (PORTSMOUTH)

FIG. 17b
CALCULATED

| VACUUM PRESSURE (in. of Hg) | | |
|---|---|---|
| 10 | 15 | 20 |
| 20.77 | 21.43 | 22.09 |
| 23.49 | 24.15 | 24.81 |
| 24.65 | 25.31 | 25.98 |
| 25.63 | 26.29 | 26.95 |

SAMPLE D (PORTSMOUTH)

FIG. 18a
EXPERIMENTAL

| $H_2O_2$ CONCENTRATION mg/L | VACUUM PRESSURE (in. of Hg) | | |
|---|---|---|---|
| | 10 | 15 | 20 |
| 0 | 15.28 | 17.45 | 18.01 |
| 2.5 | 18.12 | 18.23 | 22.43 |
| 7.5 | 19.96 | 21.91 | 26.61 |
| 15 | 28.75 | 32.38 | 34.58 |

SAMPLE E (CHESAPEAKE)

FIG. 18b
CALCULATED

| VACUUM PRESSURE (in. of Hg) | | |
|---|---|---|
| 10 | 15 | 20 |
| 23.28 | 25.19 | 27.11 |
| 31.16 | 33.08 | 35.00 |
| 34.54 | 36.45 | 38.37 |
| 37.37 | 39.28 | 41.20 |

SAMPLE E (CHESAPEAKE)

FIG. 19a

SPECIFIC RESISTANCE $\bar{r} \times 10^{13}$

| $H_2O_2$ CONCENTRATION mg/L | VACUUM PRESSURE (in. of Hg) | | |
|---|---|---|---|
| | 10 | 15 | 20 |
| 0 | 6.25 | 5.72 | 29.70 |
| 2.5 | 4.39 | 27.60 | 53.60 |
| 7.5 | 18.40 | 25.50 | 61.50 |
| 15 | 9.43 | 29.40 | 53.10 |

SAMPLE A (NORFOLK)

FIG. 19b

BLINDING COEFFICIENT

| VACUUM PRESSURE (in. of Hg) | | |
|---|---|---|
| 10 | 15 | 20 |
| -0.26 | -0.57 | +0.70 |
| -0.11 | +0.48 | +0.57 |
| +0.56 | +0.27 | +0.82 |
| -0.14 | +0.32 | +0.74 |

SAMPLE A (NORFOLK)

FIG. 20a

| $H_2O_2$ CONCENTRATION mg/L | VACUUM PRESSURE (in. of Hg) | | |
|---|---|---|---|
| | 10 | 15 | 20 |
| 0 | 1.23 | 0.85 | 3.256 |
| 2.5 | 0.78 | 1.14 | 1.33 |
| 7.5 | 0.21 | 0.89 | 0.99 |
| 15 | 0.64 | 0.90 | 1.10 |

SAMPLE B (NORFOLK)

FIG. 20b

| VACUUM PRESSURE (in. of Hg) | | |
|---|---|---|
| 10 | 15 | 20 |
| -0.66 | -0.73 | -0.59 |
| -0.49 | -0.43 | -0.28 |
| -0.50 | -0.41 | -0.31 |
| -0.45 | -0.43 | -0.26 |

SAMPLE B (NORFOLK)

FIG. 21a

| $H_2O_2$ CONCENTRATION mg/L | VACUUM PRESSURE (in. of Hg) | | |
|---|---|---|---|
| | 10 | 15 | 20 |
| 0 | 0.95 | 1.14 | 1.91 |
| 2.5 | 0.96 | 1.32 | 2.10 |
| 7.5 | 0.80 | 1.33 | 1.94 |
| 15 | 0.81 | 1.34 | 1.95 |

SAMPLE C (NEWPORT NEWS)

FIG. 21b

| VACUUM PRESSURE (in. of Hg) | | |
|---|---|---|
| 10 | 15 | 20 |
| -0.30 | -0.39 | -0.24 |
| -0.32 | -0.30 | -0.62 |
| -0.07 | -0.21 | -0.58 |
| -0.07 | -0.21 | -0.58 |

SAMPLE C (NEWPORT NEWS)

SPECIFIC RESISTANCE r̄ x 10¹³

| $H_2O_2$ CONCENTRATION mg/L | VACUUM PRESSURE (in. of Hg) | | |
|---|---|---|---|
| | 10 | 15 | 20 |
| 0 | 1.10 | 1.61 | 2.35 |
| 2.5 | 1.35 | 2.18 | 2.72 |
| 7.5 | 1.63 | 2.48 | 2.92 |
| 15 | 1.47 | 2.28 | 2.37 |

SAMPLE D (PORTSMOUTH)

BLINDING COEFFICIENT

| VACUUM PRESSURE (in. of Hg) | | |
|---|---|---|
| 10 | 15 | 20 |
| -0.30 | -0.39 | -0.50 |
| -0.45 | -0.34 | -0.25 |
| -0.53 | -0.43 | -0.38 |
| -0.53 | -0.42 | -0.42 |

SAMPLE D (PORTSMOUTH)

| $H_2O_2$ CONCENTRATION mg/L | VACUUM PRESSURE (in. of Hg) | | |
|---|---|---|---|
| | 10 | 15 | 20 |
| 0 | 2.46 | 1.69 | 5.49 |
| 2.5 | 0.59 | 0.77 | 0.89 |
| 7.5 | 0.41 | 0.76 | 0.97 |
| 15 | 0.55 | 0.94 | 1.06 |

SAMPLE E (CHESAPEAKE)

| VACUUM PRESSURE (in. of Hg) | | |
|---|---|---|
| 10 | 15 | 20 |
| -0.66 | -0.73 | -0.60 |
| -0.63 | -0.52 | -0.49 |
| -0.74 | -0.58 | -0.35 |
| -0.66 | -0.57 | -0.45 |

SAMPLE E (CHESAPEAKE)

VARIATION OF BLINDING COEFFICIENT WITH SPECIFIC RESISTANCE: SAMPLE A (NORFOLK)

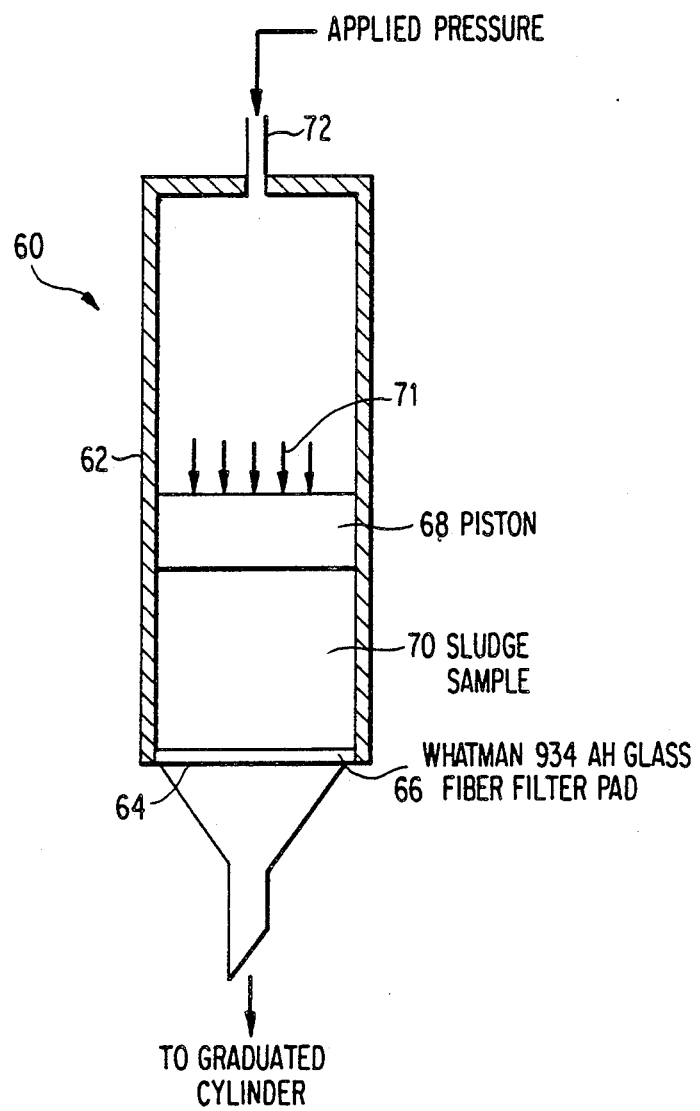

FIG. 26a
EXPERIMENTAL

| H$_2$O$_2$ CONCENTRATION mg/L | APPLIED PRESSURE (PSI) | | |
|---|---|---|---|
| | 40 | 60 | 80 |
| 0 | 16.06 | 18.01 | 18.85 |
| 2.5 | 20.05 | 21.04 | 22.11 |
| 7.5 | 25.85 | 27.64 | 29.16 |
| 15 | 40.10 | 41.61 | 44.10 |

SAMPLE A (NORFOLK)

FIG. 26b
CALCULATED

| APPLIED PRESSURE (PSI) | | |
|---|---|---|
| 40 | 60 | 80 |
| 21.77 | 23.84 | 25.91 |
| 33.38 | 35.45 | 37.52 |
| 38.52 | 40.59 | 42.66 |
| 42.87 | 44.94 | 47.01 |

SAMPLE A (NORFOLK)

FIG. 27a
EXPERIMENTAL

| H$_2$O$_2$ CONCENTRATION mg/L | APPLIED PRESSURE (PSI) | | |
|---|---|---|---|
| | 40 | 60 | 80 |
| 0 | 16.23 | 17.00 | 18.90 |
| 2.5 | 22.48 | 25.71 | 28.13 |
| 7.5 | 30.15 | 34.65 | 38.08 |
| 15 | 45.59 | 49.05 | 55.34 |

SAMPLE B (NORFOLK)

FIG. 27b
CALCULATED

| APPLIED PRESSURE (PSI) | | |
|---|---|---|
| 40 | 60 | 80 |
| 23.12 | 25.86 | 28.60 |
| 38.51 | 41.26 | 44.00 |
| 45.32 | 48.06 | 50.81 |
| 51.09 | 53.83 | 56.58 |

SAMPLE B (NORFOLK)

FIG. 28a
EXPERIMENTAL

| H$_2$O$_2$ CONCENTRATION mg/L | APPLIED PRESSURE (PSI) | | |
|---|---|---|---|
| | 40 | 60 | 80 |
| 0 | 14.20 | 15.30 | 18.10 |
| 2.5 | 16.90 | 17.10 | 18.10 |
| 7.5 | 19.24 | 19.68 | 20.45 |
| 15 | 2.10 | 23.42 | 24.32 |

SAMPLE C (NEWPORT NEWS)

FIG. 28b
CALCULATED

| APPLIED PRESSURE (PSI) | | |
|---|---|---|
| 40 | 60 | 80 |
| 18.92 | 19.57 | 20.21 |
| 22.55 | 23.20 | 23.84 |
| 24.15 | 24.80 | 25.45 |
| 25.51 | 26.16 | 26.81 |

SAMPLE C (NEWPORT NEWS)

FIG. 29a

EXPERIMENTAL

| H₂O₂ CONCENTRATION mg/L | APPLIED PRESSURE (PSI) | | |
|---|---|---|---|
| | 40 | 60 | 80 |
| 0 | 15.20 | 16.00 | 17.15 |
| 2.5 | 17.30 | 17.28 | 17.65 |
| 7.5 | 17.70 | 19.16 | 19.38 |
| 15 | 22.28 | 21.64 | 22.71 |

SAMPLE D (PORTSMOUTH)

FIG. 29b

CALCULATED

| APPLIED PRESSURE (PSI) | | |
|---|---|---|
| 40 | 60 | 80 |
| 18.69 | 19.22 | 19.75 |
| 21.67 | 22.20 | 22.73 |
| 22.99 | 23.52 | 24.05 |
| 24.10 | 24.63 | 25.17 |

SAMPLE D (PORTSMOUTH)

FIG. 30a

EXPERIMENTAL

| H₂O₂ CONCENTRATION mg/L | APPLIED PRESSURE (PSI) | | |
|---|---|---|---|
| | 40 | 60 | 80 |
| 0 | 14.42 | 15.15 | 18.20 |
| 2.5 | 19.21 | 21.11 | 22.82 |
| 7.5 | 20.10 | 25.12 | 28.18 |
| 15 | 28.34 | 30.95 | 35.48 |

SAMPLE E (CHESAPEAKE)

FIG. 30b

CALCULATED

| APPLIED PRESSURE (PSI) | | |
|---|---|---|
| 40 | 60 | 80 |
| 20.70 | 22.24 | 23.78 |
| 29.34 | 30.88 | 32.42 |
| 33.16 | 34.70 | 36.23 |
| 36.39 | 37.93 | 39.47 |

SAMPLE E (CHESAPEAKE)

FIG. 31  SPECIFIC RESISTANCE VALUES OBTAINED IN THE PRESSURE FILTRATION TEST

| SAMPLE | $H_2O_2$ CONCENTRATION mg/L | SPECIFIC RESISTANCE $\bar{r} \times 10^{13}$ | | |
|---|---|---|---|---|
| | | APPLIED PRESSURE (PSI) | | |
| | | 40 | 60 | 80 |
| A NORFOLK | 0 | 90.20 | 38.90 | 45.80 |
| | 2.5 | 72.50 | 83.80 | 89.10 |
| | 7.5 | 47.50 | 85.20 | 86.30 |
| | 15 | 36.40 | 56.40 | 85.00 |
| B NORFOLK | 0 | 9.19 | 9.45 | 10.31 |
| | 2.5 | 6.92 | 8.21 | 9.73 |
| | 7.5 | 4.24 | 5.92 | 7.32 |
| | 15 | 5.72 | 7.28 | 7.35 |
| C NEWPORT NEWS | 0 | 1.31 | 1.97 | 2.65 |
| | 2.5 | 1.86 | 2.00 | 2.68 |
| | 7.5 | 1.87 | 3.42 | 3.51 |
| | 15 | 1.35 | 2.23 | 3.53 |
| D PORTSMOUTH | 0 | 1.62 | 2.44 | 3.28 |
| | 2.5 | 2.28 | 2.45 | 3.30 |
| | 7.5 | 2.30 | 4.21 | 4.31 |
| | 15 | 1.65 | 2.73 | 4.32 |
| E CHESAPEAKE | 0 | 18.40 | 18.80 | 21.70 |
| | 2.5 | 11.90 | 14.60 | 17.30 |
| | 7.5 | 7.32 | 10.50 | 13.00 |
| | 15 | 5.19 | 4.32 | 5.25 |

FIG. 32  SAMPLE A (NORFOLK)

| $H_2O_2$ mg/L | 1000 RPM (738.47 G) | | | 3000 RPM (2058.00 G) | | | 5000 RPM (4028.00 G) | | |
|---|---|---|---|---|---|---|---|---|---|
| | 1 Min. | 2 Min. | 3 Min. | 1 Min. | 2 Min. | 3 Min. | 1 Min. | 2 Min. | 3 Min. |
| 0 | 3.60 | 3.70 | 3.85 | 4.21 | 4.50 | 4.23 | 5.06 | 5.02 | 5.60 |
| 2.5 | 4.20 | 4.56 | 5.57 | 4.58 | 4.60 | 5.63 | 5.15 | 5.31 | 6.50 |
| 7.5 | 3.80 | 4.10 | 6.20 | 4.05 | 4.23 | 5.75 | 5.22 | 5.38 | 6.93 |
| 15 | 3.90 | 4.21 | 6.32 | 4.25 | 4.62 | 5.82 | 5.31 | 5.62 | 7.10 |

FIG. 33  SAMPLE B (NORFOLK)

| 0 | 4.50 | 5.30 | 5.87 | 7.68 | 7.82 | 8.10 | 8.95 | 9.12 | 9.82 |
|---|---|---|---|---|---|---|---|---|---|
| 2.5 | 5.10 | 5.42 | 5.93 | 7.88 | 8.20 | 8.40 | 9.64 | 9.88 | 13.15 |
| 7.5 | 5.28 | 5.641 | 6.14 | 8.17 | 8.35 | 8.58 | 9.81 | 10.15 | 13.45 |
| 15 | 5.40 | 5.80 | 6.20 | 7.86 | 8.42 | 8.62 | 9.88 | 12.30 | 13.63 |

FIG. 34  SAMPLE C (NEWPORT NEWS)

| 0 | 1.50 | 1.82 | 1.99 | 2.89 | 2.91 | 3.19 | 3.80 | 3.91 | 4.42 |
|---|---|---|---|---|---|---|---|---|---|
| 2.5 | 1.52 | 1.75 | 2.08 | 2.91 | 3.05 | 3.38 | 3.93 | 4.30 | 4.93 |
| 7.5 | 1.70 | 1.86 | 2.00 | 2.98 | 3.15 | 3.41 | 4.03 | 4.72 | 4.85 |
| 15 | 1.80 | 1.79 | 2.26 | 3.07 | 3.35 | 3.62 | 4.23 | 4.54 | 4.83 |

FIG. 35  SAMPLE D (PORTSMOUTH)

| 0 | 2.56 | 2.82 | 3.01 | 3.50 | 3.72 | 4.68 | 4.28 | 4.68 | 5.48 |
|---|---|---|---|---|---|---|---|---|---|
| 2.5 | 2.58 | 2.88 | 3.11 | 3.61 | 3.81 | 4.66 | 4.47 | 4.73 | 5.63 |
| 7.5 | 2.58 | 2.91 | 3.18 | 3.72 | 3.98 | 4.79 | 4.52 | 4.88 | 5.71 |
| 15 | 2.59 | 2.99 | 3.19 | 4.12 | 4.15 | 4.96 | 4.81 | 5.23 | 7.12 |

FIG. 36  SAMPLE E (CHESAPEAKE)

| 0 | 3.20 | 3.51 | 4.38 | 4.91 | 5.22 | 7.52 | 6.32 | 7.28 | 8.15 |
|---|---|---|---|---|---|---|---|---|---|
| 2.5 | 3.40 | 3.73 | 4.39 | 4.96 | 6.28 | 7.68 | 6.55 | 7.54 | 9.22 |
| 7.5 | 3.45 | 3.85 | 4.44 | 5.13 | 6.81 | 7.81 | 6.82 | 7.63 | 9.86 |
| 15 | 3.80 | 3.96 | 5.62 | 6.27 | 6.91 | 8.10 | 6.97 | 8.41 | 10.82 |

FIG. 37 METAL ANALYSIS OF THE FILTRATES GENERATED IN VARIOUS DEWATERING PROCESSES: SAMPLE A (NORFOLK)

| SAMPLE WITH H2O2 CONCENTRATION (mg/L DOSE) | FILTRATES FROM ||||||||||||
|---|---|---|---|---|---|---|---|---|---|---|---|---|
| | SAND BED ||| VACUUM FILTRATION ||| PRESSURE FILTRATION ||| CENTRIFUGE |||
| | mg/L ||| mg/L ||| mg/L ||| mg/L |||
| | Al | Fe | Mn | Al | Fe | Mn | Al | Fe | Mn | Al | Fe | Mn |
| 0 | 18.52 | 1.65 | 0.78 | 8.42 | 0.01 | 2.48 | 18.0 | 1.24 | 2.08 | 18.7 | 5.47 | 2.25 |
| 2.5 | 4.20 | 1.18 | 4.25 | 4.80 | 0.01 | 1.45 | 5.0 | 0.07 | 1.01 | – | – | – |
| 7.5 | 1.46 | 0.30 | 3.22 | 1.53 | 0.07 | 2.87 | – | – | – | 2.6 | 5.97 | 1.90 |
| 15 | 1.28 | 0.02 | 1.26 | 1.28 | 0.01 | 2.36 | – | – | – | 2.1 | 5.15 | 0.63 |

FIG. 38   METAL ANALYSIS OF THE FILTRATES GENERATED IN VARIOUS DEWATERING PROCESSES: SAMPLE B (NORFOLK)

| SAMPLE WITH H2O2 CONCENTRATION (mg/L DOSE) | FILTRATES FROM ||||||||||||
|---|---|---|---|---|---|---|---|---|---|---|---|---|
| | SAND BED ||| VACUUM FILTRATION ||| PRESSURE FILTRATION ||| CENTRIFUGE |||
| | mg/L ||| mg/L ||| mg/L ||| mg/L |||
| | Al | Fe | Mn | Al | Fe | Mn | Al | Fe | Mn | Al | Fe | Mn |
| 0 | 12.00 | 0.04 | 56.80 | 11.00 | 5.10 | 69.25 | 11.80 | 15.50 | 59.32 | 13.58 | 70.60 | 68.29 |
| 2.5 | 11.60 | 3.74 | 79.10 | 11.40 | 3.24 | 74.25 | 11.38 | 7.90 | 76.98 | 12.80 | 66.70 | 70.20 |
| 7.5 | 1.58 | 0.02 | 79.24 | 1.62 | 0.03 | 74.57 | 1.60 | 0.53 | 68.55 | 2.12 | 21.80 | 78.00 |
| 15 | 1.20 | 0.04 | 79.60 | 1.22 | 0.02 | 75.90 | 1.19 | 0.29 | 77.44 | 1.90 | 43.80 | 65.50 |

FIG. 39  METAL ANALYSIS OF THE FILTRATES GENERATED IN VARIOUS DEWATERING PROCESSES: SAMPLE C (NEWPORT NEWS)

| SAMPLE WITH H2O2 CONCENTRATION (mg/L DOSE) | FILTRATES FROM ||||||||||||
|---|---|---|---|---|---|---|---|---|---|---|---|---|
| | SAND BED ||| VACUUM FILTRATION ||| PRESSURE FILTRATION ||| CENTRIFUGE |||
| | mg/L ||| mg/L ||| mg/L ||| mg/L |||
| | Al | Fe | Mn | Al | Fe | Mn | Al | Fe | Mn | Al | Fe | Mn |
| 0 | 10.00 | 0.20 | 15.55 | — | 1.85 | 17.05 | 9.98 | — | — | 11.52 | 2.66 | 15.02 |
| 2.5 | 9.70 | 0.01 | 15.30 | 10.30 | — | — | 9.50 | — | — | 10.10 | 0.06 | 15.44 |
| 7.5 | 2.10 | 0.04 | 15.80 | 2.20 | 0.01 | 16.42 | 2.00 | 0.05 | 17.55 | 2.80 | 0.02 | 17.55 |
| 15 | 1.40 | 0.03 | 17.35 | 1.41 | 15.52 | 11.35 | 1.40 | — | — | 1.80 | 0.02 | 20.74 |

FIG. 40  METAL ANALYSIS OF THE FILTRATES GENERATED IN VARIOUS DEWATERING PROCESSES: SAMPLE D (PORTSMOUTH)

| SAMPLE WITH H2O2 CONCENTRATION (mg/L DOSE) | FILTRATES FROM | | | | | | | | | | |
|---|---|---|---|---|---|---|---|---|---|---|---|
| | SAND BED | | | VACUUM FILTRATION | | | PRESSURE FILTRATION | | | CENTRIFUGE | | |
| | mg/L | | | mg/L | | | mg/L | | | mg/L | | |
| | Al | Fe | Mn | Al | Fe | Mn | Al | Fe | Mn | Al | Fe | Mn |
| 0 | 10.62 | 0.32 | 31.90 | — | — | — | — | — | — | 12.68 | 6.60 | 21.22 |
| 2.5 | 9.83 | 0.44 | 32.20 | 9.81 | 0.01 | 22.50 | — | — | — | 10.11 | 8.25 | 42.45 |
| 7.5 | 4.32 | 0.23 | 32.10 | 4.30 | 0.01 | 29.20 | — | — | — | 5.01 | 7.70 | 44.05 |
| 15 | 1.46 | 0.13 | 38.57 | 1.40 | 0.01 | 40.50 | — | — | — | 3.16 | 9.46 | 49.70 |

FIG. 41    METAL ANALYSIS OF THE FILTRATES GENERATED IN VARIOUS DEWATERING PROCESSES:
SAMPLE E (CHESAPEAKE)

| SAMPLE WITH H₂O₂ CONCENTRATION (mg/L DOSE) | FILTRATES FROM ||||||||||||
|---|---|---|---|---|---|---|---|---|---|---|---|---|
| | SAND BED ||| VACUUM FILTRATION ||| PRESSURE FILTRATION ||| CENTRIFUGE |||
| | mg/L ||| mg/L ||| mg/L ||| mg/L |||
| | Al | Fe | Mn | Al | Fe | Mn | Al | Fe | Mn | Al | Fe | Mn |
| 0 | 8.91 | 1.30 | 6.34 | — | — | — | — | — | — | 9.54 | 34.20 | 4.50 |
| 2.5 | 6.36 | 0.02 | 6.47 | 6.39 | 0.01 | 7.40 | — | — | — | 7.25 | 46.50 | 7.35 |
| 7.5 | 5.83 | 0.03 | 6.35 | 5.81 | 0.01 | 9.30 | — | — | — | 7.60 | 41.50 | 7.57 |
| 15 | 3.22 | 0.06 | 6.01 | 3.10 | 0.01 | 9.05 | 3.10 | 0.42 | 9.05 | 5.18 | 46.20 | 8.85 |

METHOD FOR DEWATERING ALUM SLUDGE

BACKGROUND OF THE INVENTION

1. Field of the Invention

The present invention generally relates to methods for dewatering sludge and, in particular, alum sludge produced at a water treatment plant. Experiments have been conducted which show that treating alum sludge with hydrogen peroxide ($H_2O_2$) prior to standard dewatering processes increases the efficiency of those processes.

2. Description of the Prior Art

The use of aluminum sulfate (alum or filter alum) as a coagulant for treating surface water was introduced in 1884. When this salt is added to water, the aluminum ion hydrolyzes by reactions that consume alkalinity in water. Equation 1 is representative of the reaction in water:

$$Al(H_2O)_6^{3+} + {}^-3HCO_3 \rightarrow Al(OH)_3 \cdot 3H_2O(S) + 3CO_2 + 3H_2O \qquad 1.$$

The above reaction produces a gelatinous hydroxide which carries suspended material with it as it settles. In addition, it is likely that positively charged hydroxyl bridged dimers and higher polymers are formed which interact specifically with colloidal particles to bring about coagulation. These gelatinous flocs are heavier than water and settle by gravity. The disposal of these sediments (sludges) from water treatment plants is not a new problem. The majority of water treatment plants have disposed of these sludges by discharging them to a downstream point of the raw water source. Under current federal and state laws, these sludges are considered pollutants and certain requirements must be met for their proper disposal.

Water plant sludges are often characterized by high water content (generally, low suspended solids concentrations), high resistance to mechanical or gravity dewatering, and having other problems associated with their handling and ultimate disposal. These sludges are highly variable in composition and contain both the concentrated materials removed from raw water and the chemicals added in the treatment processes. Alum sludge dewatering remains one of the most difficult and elusive of the environmental engineering challenges. One of the most troubling problems with alum sludge dewatering is that there seems to be no accepted means to evaluate the ease with which a particular sludge will release its water.

U.S. Pat. No. 3,720,608 to Stauffer discloses a method and apparatus for conditioning and disposing of alum sludge from a water treatment plant. The method requires subjecting the sludge to boiling temperatures (212° F.) for thirty minutes, then separating the solids from the liquid fraction by decanting to produce a low moisture content sludge cake which is suitable for disposal. The time and cost of energy for heating the alum sludge which are specified by Stauffer are not suitable for modern requirements. What is needed is a low cost treatment scheme which can rapidly aid in dewatering alum sludge.

It is known to use $H_2O_2$ in the waste water industry either as an oxidizing agent or as a means for treating filamentous bulking in activated sludge. U.S. Pat. No. 3,530,067 to Friedman discloses a method of treating sewage which employs $H_2O_2$ to improve settling of biological materials. U.S. Pat. No. 4,221,661 to Shimizu et al. discloses a method of dehydrating organic sludge which employs high concentrations of $H_2O_2$ for oxidizing the sludge. In Shimizu et al., the sewage sludge is acidified, heated and treated with $H_2O_2$, and then is subsequently cooled down. U.S. Pat. No. 4,244,818 to Abson discloses a method for removing metallic impurities from sewage sludge which requires a pH adjustment of the sludge (by acidifying, metals go into solution) then treatment with $H_2O_2$. Abson does not discuss an resulting improvement in dewatering and in fact is designed to have less metal retained in the sludge.

Several research reports and patents have discussed the benefits of treating sewage and waste water sludge with $H_2O_2$. Some of the benefits include enhancing solids settling, retaining heavy metals in solution, reducing odors, reducing the amount of organic matter in the sludge, and enhancing the dewatering of the sludge by more or less conventional means. In all studies known by the applicant which are related to enhancing the dewatering of sewage sludge with $H_2O_2$, very high concentrations of $H_2O_2$ were utilized, i.e., in all studies more than 100 mg/l $H_2O_2$ was used and the amount used typically ranged between 1000 mg/l to 2000 mg/l. In addition, in all cases other operations such as pH adjustment, polymer addition, heat treatment, etc., or some combination of the above, were an integral part of the process involving $H_2O_2$ usage. These high concentrations of $H_2O_2$, acid and alkali additions, and heating and cooling operations all singularly or in combination make the processes prohibitively expensive for augmenting conventional sewage sludge dewatering processes. Hence, no municipal sewage treatment plant in the United States of which the applicant is aware uses $H_2O_2$ for enhancing dewatering of sewage sludge. Other conventional dewatering enhancement techniques have invariably proved more economical.

Sewage sludge, both raw and from biological sewage treatment processes, is quite different from alum sludge produced at a water treatment facility. The solid portion of the sewage sludge is primarily organic in nature. Conversely, a principal portion of the alum sludge is aluminum hydroxide or some variable thereof which is formed from the reaction of aluminum sulfate (which is added to the water) and alkalinity (either natural or, as is often the case, added). It is normal for the aluminum sulfate concentration added to the water being treated to exceed the concentration of suspended solids removed from the water. Thus, it is readily deduced and, in fact, has been shown that it is the aluminum hydroxide that is the principal constituent of alum sludge that is the root cause of dewatering problems with alum sludge. To date, there is no economical common dewatering enhancement process which is equally effective on sewage sludge and alum sludge and it is believed that this is because of a fundamental difference in the nature of the sludges.

SUMMARY OF THE INVENTION

It is therefore an object of the present invention to provide a method for enhancing the efficiency of conventional dewatering processes for alum sludge by pretreating alum sludge with $H_2O_2$ prior to dewatering.

It is another object of this invention to provide an economical method for enhancing the efficiency of conventional dewatering processes for alum sludge which requires pretreatment of alum sludge with only modest amounts of $H_2O_2$ and with only conventional mixing techniques, and does not require elaborate pH adjustment or temperature treatment schemes.

According to the invention, $H_2O_2$ was utilized in an effort to improve the dewaterability of alum sludge residuals generated at four water treatment plants in southeastern Virginia. After treatment of these residuals at $H_2O_2$ concentrations of 2.5 to 15 mg/1, dewaterability was improved by up to three hundred percent when compared to residuals receiving no $H_2O_2$. Processes used for dewatering after $H_2O_2$ addition included sand bed filtration (gravity filtration), centrifugation, vacuum filtration, and pressure filtration. Each of the above dewatering processes are well recognized, standard processes in common use at water treatment facilities across the United States.

Multiple regression analysis of residual cake solids content formed during pressure and vacuum filtration indicated that cake solids content was most significantly related to the initial solids (raw residuals) concentration, the $H_2O_2$ dose, and the pressure or vacuum utilized. A model equation of this relationship explained eighty percent of the variability in the cake solids content. It is likely that chemical reactions of $H_2O_2$ with organics and metals altered the size distribution of the particles since particle size distribution has been observed to be significantly related to the dewaterability of alum sludge.

During the dewatering experiments utilizing the various dewatering processes after $H_2O_2$ addition, chemical analysis of leachate collected indicated that $H_2O_2$ influenced the mobility of aluminum and iron. In all experiments for the four different residuals examined, aluminum and iron concentrations in the leachates were inversely correlated to the $H_2O_2$ dose added to the residual. The cause of the improved retention of metals at higher $H_2O_2$ concentrations was not determined but may be related to the oxidation of organic ligands since organic ligands that complex aluminum and iron have been shown to increase metal solubility. Since many metals of environmental concern readily complex with organics, the use of $H_2O_2$ appears to be a new method that may effectively minimize the residual solids from water treatment plants generating alum sludge and at the same time produce water released from the residual that is low in toxic heavy metals and consequently requires less costly or no additional treatment.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a table showing the measured sludge characteristics for the raw alum sludge samples used in the experiments;

FIG. 3 is a table showing the determined metal analysis results for the raw alum sludge samples used in the experiments;

FIG. 4 is a graph of the capillary suction time versus the initial solids concentration for the raw alum sludge samples used in the experiments;

FIG. 5 is a table showing the capillary suction times for sludge samples before and after hydrogen peroxide addition;

FIGS. 7-11 are three dimensional graphs showing the variation of percent drainage with $H_2O_2$ concentration and drainage time through the test apparatus of FIG. 6 for five different samples of alum sludge;

FIG. 12 is a table showing the calculated cake solids concentration for alum sludge samples with varying concentrations of $H_2O_2$ which were subjected to the sand bed test;

FIGS. 14$a$-$b$, 15$a$-$b$, 16$a$-$b$, 17$a$-$b$, and 18$a$-$b$ are tables showing the experimentally measured cake solids concentration using vacuum filtration and the calculated cake solids concentration using a mathematical model, respectively, for the alum sludge samples from the four waste water treatment facilities when different vacuum pressures were applied to the Buchner funnel test apparatus shown in FIG. 13;

FIGS. 19$a$-$b$, 20$a$-$b$, 21$a$-$b$, 22$a$-$b$, and 23$a$-$b$ are tables showing the specific resistance and the blinding coefficient for the alum sludge samples from the four waste water treatment facilities when different vacuum pressures were applied to the Buchner funnel test apparatus shown in FIG. 13;

FIG. 25 is a cross-sectional schematic diagram of an apparatus used for pressure filtration testing;

FIGS. 26$a$-$b$, 27$a$-$b$, 28$a$-$b$, 29$a$-$b$, and 30$a$-$b$ are tables showing the experimentally measured pressure filtration cake solids concentration obtained and the calculated pressure filtration cake solids concentration, respectively, obtained for alum sludge samples from four water treatment facilities when varying pressures were applied using the apparatus shown in FIG. 25;

FIG. 31 is a table showing the calculated specific resistance values of the alum sludge obtained in the pressure filtration test at differing pressures and concentrations of $H_2O_2$;

FIGS. 32-36 are tables showing the experimentally measured cakes solids concentrations obtained during the centrifuge test for alum sludge from four water treatment facilities when varying speeds of rotation were used; and FIGS. 37-41 are tables showing the experimentally measured metal analysis of the filtrates generated during the various dewatering experiments.

DETAILED DESCRIPTION OF A PREFERRED EMBODIMENT OF THE INVENTION

Experiments were conducted to evaluate the effect of $H_2O_2$ addition on alum sludge dewaterability. The experiments considered sludge macroproperties such as pH, alkalinity, metals content, capillary suction time (CST), and specific resistance. Specific dewatering processes investigated included sand beds, centrifugation, vacuum filtration, and pressure filtration.

Figure 1:
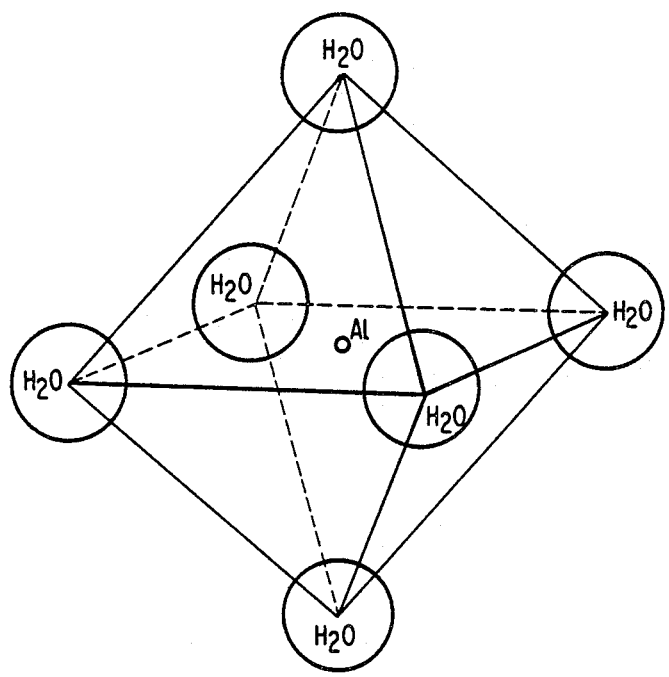
FIG. 1 is a schematic representation of hydrolyzed aluminum ion.

The aluminum ion is relatively small and has a high charge when compared to water molecules. FIG. 1 shows that when dissolved in water, aluminum can be surrounded by a tightly-bound shell of water molecules to form an aluminum-water octahedron. The size of the aluminum ion and the water molecules are such that the aluminum ion will lie in the center of the octahedron and a water molecule is attached at each vertex. In the presence of polynuclear aluminum species, it is water and organic matter, locked into the floc, that is responsible for the jellylike consistency of the alum sludge. The experiments discussed in detail below indicated that treating the alum sludge with the $H_2O_2$ oxidizing agent prior to dewatering the sludge results in increased dewatering efficiency. It is believed that oxidation can weaken the bonds between the aluminum species and water molecules. Organic particulate matter in the alum sludge can also be oxidized for enhanced dewatering.

Preliminary investigations showed that when dilute solutions of $H_2O_2$ were reacted with $Al(OH)_3$, oxygen and water appeared to be liberated. $H_2O_2$ is a colorless liquid miscible with water and glycerine in all proportions. Highly purified aqueous solutions of $H_2O_2$ are fairly stable. In the presence of impurities, such as metal ions, hydrogen peroxide is decomposed into water and nascent oxygen. The reagent decomposes on standing, especially in a warm place or in warm weather. For this reason it should be purchased in small lots and after the container has been opened, it should be tightly closed. During the experimentation period, the strength of the $H_2O_2$ was periodically determined.

For the experiments, water treatment plant sludges generated at four major treatment plants in the Hampton Roads area of Southeastern Virginia were examined. Plant selection was based on their capacity to generate alum sludge and their accessibility. Sludge sources were from Norfolk, Newport News, Portsmouth, and Chesapeake water treatment plants. All sludge samples were transported to the environmental engineering laboratory located at Old Dominion University in 5 gallon plastic containers. At the laboratory, all sludge samples were stored at 6° C. to minimize changes in sludge properties from biological activity during the experimentation period.

All raw alum sludge samples were tested for solids concentration, pH, alkalinity, and metals content at the environmental engineering laboratory prior to treatment with $H_2O_2$. To perform the solids determination, each alum sludge sample (raw) was tested for its total and volatile solids content. Because it was difficult to pipet an exact amount of raw sludge, total solids were determined on a weight basis, using the procedure for total and volatile residue, as outlined in "Standard Methods for Examination of Water and Wastewater", 14th ed., Washington, D.C., American Public Health Association, (1979). Measurements of pH for all the raw sludges were made using an Orion pH meter, model 811, before any addition of hydrogen peroxide and carrier water. The filtrates generated from the dewatering tests were also measured for pH. The procedures in "Standard Methods", noted above, were followed for determining the alkalinity of raw sludge samples and the alkalinity and turbidity of all filtrates generated during the different dewatering tests. Metal analysis was performed using a flame atomic absorption unit (Perkin-Elmer, Model HG 603) to determine the concentrations of aluminum, iron and manganese both in the raw sludges and in the filtrates from various dewatering tests. The procedure for metal analysis is described in "Standard Methods" which is noted above.

The characteristics of sludges produced in water treatment plants can vary greatly due to the differences in the raw water characteristics and plant design and operation. FIG. 2 lists the raw sludge characteristics for each sludge sample used in this study. Note that two different sludges for Norfolk (A and B) were analyzed. The Norfolk plant uses different raw water sources and they are mixed somewhat differently in various parts of the treatment plant. Samples A and B were taken from two different parts of the plant and, in effect, give two different alum sludge samples. Sludge solids concentrations ranged from 0.78 to 4.03 percent. Alkalinity of all sludges were found to be high (350 to 1400 mg/l as $CaCO_3$) High alkalinity is generally expected for water treatment plant sludges. In general, alkalinity was found to increase with increasing solids concentration, except for sludge sample A (Norfolk) which showed higher alkalinity values. FIG. 3 lists the results of the metal analysis for the raw alum sludge samples. All samples were found to have high aluminum and iron concentrations, as compared to the manganese concentrations.

Preliminary investigations were carried out on the Norfolk water treatment plant alum sludge to determine the optimum carrier water addition for an adequate reaction between varying hydrogen peroxide concentrations and the raw sludge. For each of four concentrations of hydrogen peroxide chosen (0, 2.5, 7.5 and 15 mg/l), the carrier water addition was varied between 0, 5, 10, 20 and 30 percent. Preliminary tests were conducted by using sand bed drainage, vacuum filtration, and pressure filtration tests, all of which are known in the art and are discussed below. Based on the preliminary findings, successful results on the sludge samples could be obtained using 5 percent carrier water.

Alum sludge samples were prepared for experimentation by transferring sludge from the storage containers to two liter coagulation jars and allowing the sludge samples to reach room temperature prior to experiment. Mixing the sludge samples with the $H_2O_2$ was performed using a digital Phipps and Bird, Model 7790-400, six place jar test apparatus. The sludge samples were subjected to an initial five to ten second rapid mixing period (300 rpm), following the addition of hydrogen peroxide. Then, the samples were mixed slowly (50 rpm) for one minute to develop an adequate reaction time between the sludge and the hydrogen peroxide. Before further testing, the samples were allowed to stand for twenty minutes.

Capillary Suction Time (CST) is a very useful test for quickly determining the ability of the sludge to release water in the dewatering processes. The CST apparatus used in the experiments was built at the environmental engineering laboratory at Old Dominion University and consists of two teflon blocks, a teflon collar, a piece of filter paper, four electrical contacts that are fixed in the upper plastic block, and a digital timer. The equipment was assembled with a filter paper placed between the two teflon blocks and the collar placed in the opening of the upper teflon block. To eliminate moisture in the filter paper before assembly, the paper was oven dried and stored in a desiccator. The test was started by pouring a measured amount of sludge into the collar. Water from the sludge sample flowed through the filter paper, forming a circular wet blot. After the liquid interface moved 0.5 cm past the collar edge, it reached a first pair of contacts causing an electrical signal (logic low) to start the timer. After the front moved another 1 cm, it reached a second pair of contacts, sending another electrical signal (logic high) to stop the timer. The capillary suction time was then read directly from the timer and reported in seconds. A 50 ml sample size was used in this test.

When evaluating sludge dewatering characteristics, the CST test should be viewed as a preliminary test to shorten the time required for more expensive dewatering tests that follow. However, good CST test results do not guarantee that a sludge can be readily dewatered on a vacuum or pressure filter. FIG. 4 shows that there may be a relationship between sludge CST and initial solids concentration (Co). In FIG. 4, CST values generally increased with increasing concentrations of the sludge. Only the sludge sample from Norfolk water treatment plant (Norfolk (A)), which had a higher CST value than Norfolk (B), departed from this increasing trend. One possible reason for this higher CST may be due to the oily nature of sample A (Norfolk) which resulted in a thin film of oil on the filter paper, eventually covering the filter. Also due to the oily nature of this sample, a higher volatile solids concentration was observed as compared to the other samples tested.

FIG. 5 shows that CST was generally found to decrease with increasing $H_2O_2$ dosages. This indicates that $H_2O_2$ addition will probably enhance the dewatering of alum sludge when using conventional dewatering processes.

Figure 6:
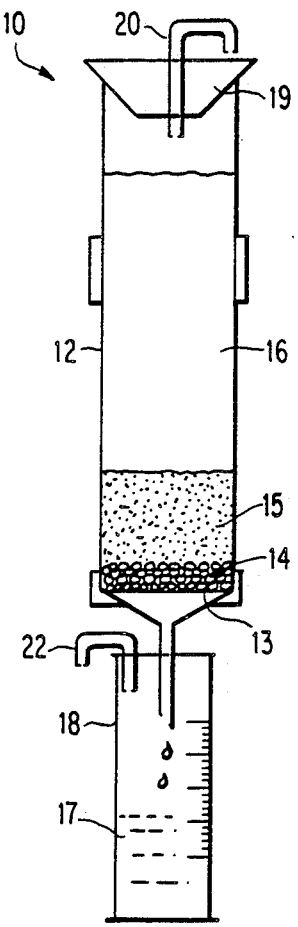
FIG. 6 is a cross-sectional schematic diagram of the sand bed drainage test apparatus.

FIG. 6 shows a drainage test apparatus 10 used to evaluate sludge dewatering on a sand bed. Sludge dewatering on a sand bed is a practical means of sludge dewatering in common use where sufficient land is available. The test apparatus 10 comprises a drainage cylinder 12 with a metal screen 13 at the bottom. Inside the drainage cylinder 12, a thin layer of coarse sand 14 is positioned on top of the metal screen and a thicker layer of fine sand 15 is positioned above the coarse sand 14. In the experiments the drainage cylinder 12 was 25 mm in diameter, the coarse sand 14 was 15 mm deep and had a grain size of 3 mm, and the fine sand 15, which served as the filter media, was 75 mm deep and was Ottowa Silica Sand C-190.

To perform the sand bed test, a sludge sample 16 is deposited on top of the fine sand 15 layer and permitted to filter therethrough. Filtrate 17 is collected in a graduated cylinder 18 positioned below the drainage cylinder 12. During the test, a rubber stopper 19 with an inverted U shaped tube 20 is placed in the top of the drainage cylinder 12 and a rubber stopper (not shown) with an inverted U shaped tube 22 is placed in the top of the graduated cylinder 18. The inverted U shaped tubes 20 and 22 provided air vents which allowed for gravity drainage. Before each sand bed drainage test was performed, the sand 15 was saturated with distilled water and allowed to drain. This drained distilled water was collected in a plastic bottle and used as a blank for metal analysis in the filtrate. A 100 ml sludge sample 16 was then poured into the sand bed drainage cylinder 12. The filtrate 17 was collected in the 100 ml graduated cylinder 18. The filtrate 17 volume collected was recorded as a function of time for a one hundred hour period at four hour intervals. The rubber stoppers in the drainage cylinder 12 and graduated cylinder 18 served to minimize losses due to evaporation. Cake solids concentration was calculated by multiplying the initial solids concentrations of the individual sludge samples to the ratio of initial to final sludge height (after dewatering) in the sand bed column.

FIGS. 7 through 11 show the variation in percent drainage for alum sludge samples from the four sludge producing facilities over a 100 hour drainage time and various $H_2O_2$ concentrations. FIGS. 7 and 8 show the results of two different samples from the Norfolk facility. The addition of $H_2O_2$ improved the rate of gravity drainage in all cases. Sludge samples from Newport News and Portsmouth drained fairly rapidly even with no $H_2O_2$ added. However, a small dose of $H_2O_2$ to these sludge samples gave rise to about 95 percent drainage within 100 hours of the initiation of drainage. The drainability of sludge samples from Norfolk (Samples A and B) and Chesapeake (Sample E) water treatment plants, improved significantly with increasing $H_2O_2$ concentration within the 100 hour drainage time. The sample from Newport News (Sample C) showed about 98 percent drainage with a 2.5 mg/l $H_2O_2$ dose over a 100 hour drainage time. In general, it was observed that samples having low Co values showed maximum drainability even with a smaller dose of $H_2O_2$.

FIG. 12 presents the calculated cake solids concentrations (Ck) for the sand bed tests illustrated in FIGS. 7-11 in tabular form. The cake solids concentration was doubled for samples treated with a 7.5 and a 15 mg/l $H_2O_2$ concentration over untreated samples or samples treated with lower $H_2O_2$ concentrations. The basis for the calculated numbers in FIG. 12 is 100 hours of drainage time. Since alum sludge must be on the order of twelve percent or greater in solids concentration before it can be handled as a solid or semi-solid, it can be seen that given 100 hours of drainage time only the $H_2O_2$ treated sludge would reach this state.

Figure 13:
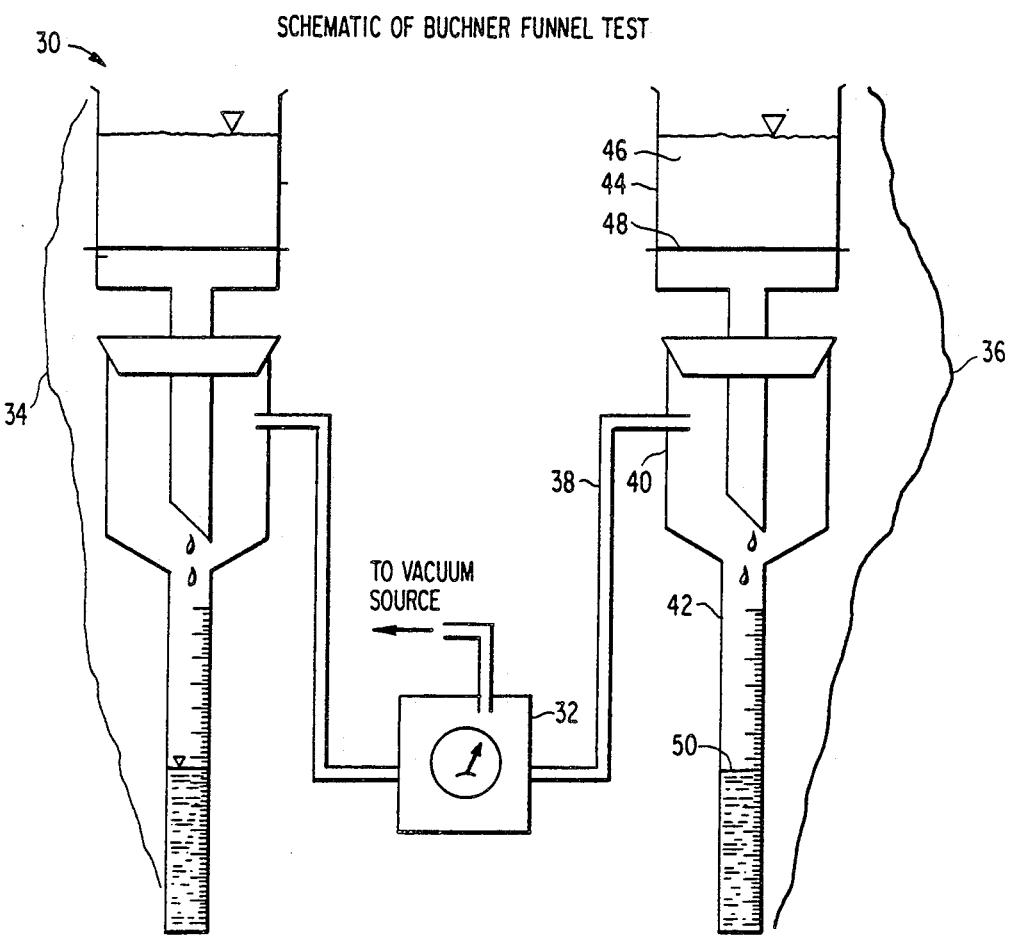
FIG. 13 is a cross-sectional schematic drawing of a Millipore ® Buchner funnel test apparatus.

FIG. 13 shows a schematic drawing of a Millipore ® filtration unit 30 used to perform a standard Buchner funnel test. The Buchner funnel test measures vacuum filtration rates of a sludge sample. The filtration unit 30 includes a vacuum source (not shown) connected to a vacuum gauge and regulator 32. The vacuum gauge and regulator 32 can be connected to more than one funnel arrangement 34 and 36 in order for two samples to be run simultaneously. Conduits 38 connect the regulator to a teflon ® fitting 40 which is joined to a graduated buret 42. In the Buchner funnel experiments, a 100 ml graduated buret 42 was utilized. A Buchner funnel 44 is connected to the teflon ® fitting 40 by a rubber stopper 46. The arrangement allows vacuum pressure to be exerted in a controlled manner on a alum sludge sample 46 which is deposited on top of a filter medium 48 inside the Buchner funnel 44. In the experiments, a 4.25 cm diameter Whatman 934 AH glass fiber filter pad was used as the filter medium 48.

In conducting the Buchner funnel filtration tests, approximately 100 ml of distilled water was poured into the Buchner funnel 44. A vacuum was applied which pulled the water through the filtering medium 48. Pulling the water through the filter medium 48 effectively sealed the filter pad to the Buchner funnel 44. Excess distilled water, which passed through the filter pad 48 to the buret 42, was collected and used as a blank for metal analysis. After the filter pad 48 was sealed, twenty milliliters of the sludge sample 46 was slowly poured into the Buchner funnel 44 to minimize the turbulence. Approximately thirty seconds was allowed as a soaking period for the filter pad 48 to minimize the resistance it would exert on filtration. Vacuum pressure was applied after the soaking period and timing was initiated as soon as the desired vacuum was reached. Reading and recording of the filtrate 50 volume was performed at one minute intervals for the duration of the test. The test duration depended on the filtration rate and varied for different sludge samples with different $H_2O_2$ dosages. Filtration was continued until the cake started cracking, breaking the vacuum. The cake solids concentration was determined on a weight basis.

By measuring the volume of filtrate 50 collected as a function of time and using a logarithmic plot of filtration time and filtrate volume, the specific resistance ($\alpha$) value for the initial volume of filtrate was calculated using the equation (2):

$$ln t = (\beta+2) \ln V + \ln[\mu\alpha c/(\beta^*2)PA^2]V^{\eta+2}.\qquad\text{(Eq. 2)}$$

The average specific resistance (r) over the entire filtered volume was calculated using the previously calculated values of $\alpha$ and $\beta$ and the equation (3):

$$r = \alpha V^\beta \qquad 3.$$

where $\beta$ is a constant characterizing "Blinding". Vacuum levels used in this study were 10, 15 and 20 inches of Hg.

The Buchner Funnel test gives a good indication of the relative degree of dewaterability, which can be obtained for each sludge sample and hydrogen peroxide combination. Good results on the Buchner Funnel does not, however, guarantee that a particular combination of sludge and $H_2O_2$ dose will give similar performance on any actual vacuum filter. The operation, nature of the filter media, and the nature of the cake release is different for each type.

FIGS. 14a, 15a, 16a, 17a, and 18a show the experimental results from the vacuum filtration test for alum sludge samples from the Norfolk (sample A), Norfolk (sample B), Newport News, Portsmouth, and Chesapeake water treatment facilities, respectively. FIGS. 14b, 15b, 16b, 17b, and 18b show the calculated cake solids concentration for the sludges determined using a mathematical model discussed below. The Figures show that increased concentrations of $H_2O_2$ in the alum sample produce vacuum filtration cake solids with higher concentrations. The Figures also show that increased vacuum pressures produce more highly concentrated vacuum filtration cake solids. Experimental results for vacuum filtration show that the sludge samples from Norfolk (A and B) and Chesapeake (Sample E) water treatment plants gave excellent cake solids concentrations, ranging from 20 percent to about 60 percent as compared to the samples from Newport News (Sample C) and Portsmouth (Sample D), which ranged from 15 to 25% and 12 to 25%, respectively.

FIGS. 19a-b, 20a-b, 21a-b, 22a-b, and 23a-b show values for the calculated specific resistance (r) and the blinding coefficient for the alum sludge samples from the four waste water treatment facilities. The data in the Figures generally show that where the blinding coefficient is less than zero, the average specific resistance decreased as filtration proceeded. This effect may occur with compressible solids in the manner described in Gale, "Filtration Theory with Special Reference to Sewage Sludges," *Water Pollution Control*, 622 (1967), where the layer close to the filter media is subjected to the greatest pressure and, therefore, compresses to a greater degree. Each added layer of solids will have a specific resistance slightly less than the preceding layer so that the average specific resistance decreases continuously.

Figures 22A, 22B, 23A, 23B, 24:
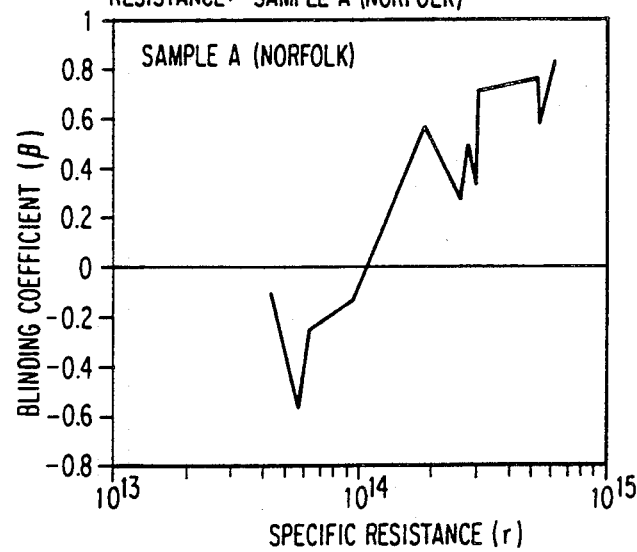
FIG. 24 is a graph showing the variation of the blinding coefficient with respect to the specific resistance obtained during the Buchner funnel test of one alum sludge sample from Norfolk.

All samples tested during this experimentation exhibited this behavior except Norfolk (Sample A) which is tabulated in FIGS. 19a-b. Sample A (Norfolk) showed blinding (beta more than zero) giving higher values of specific resistance as filtration proceeded. During the filtration test for Norfolk (Sample A) it was observed that a thin film of oil as deposited on the filter paper. It is suspected that this thin film of oil contributed towards blinding and made it progressively more difficult to dewater. To explore this further, blinding coefficients were plotted against the average specific resistance (r) estimated from Buchner funnel data for Norfolk (Sample A). FIG. 24 shows that the blinding coefficient ($\beta$) and the average specific resistance (r) appear to be related. As the average specific resistance increased to more than $1 \times 10^{14}$ m/kg, blinding always occurred.

FIG. 25 shows the filter apparatus used in the pressure filtration (filter press test) study. The filter press 60 includes a 4.7 cm diameter stainless steel filter holder 62, a porous metal support 64 holding a Whatman 934 AH Glass fiber filter pad 66, and a piston 68 sized to fit within the filter press 60. An alum sludge sample 70 is added to the filter press 60. In operation, air pressure 71 from conduit 72 is applied to the backside of the piston 68 so that the sludge is squeezed through the filter pad 66 into a graduated cylinder (not shown) for collection and measurement. A pressure regulator (not shown) is positioned in conduit 72 so that the air pressure can be tightly controlled.

In the pressure filtration experiments, a 20 ml sludge sample 70 was placed in a filter holder. The filter holder was then fixed to the 200 ml reservoir making up the body of the filter press 62 while the piston 68 was positioned inside it. The sample size was chosen in order to produce a filter surface loading rate similar to that used for the vacuum filtration and sand bed drainage tests. A pressure differential was applied across the sludge sample using compressed air. All filter press dewatering tests were controlled at pressure levels of 40, 60 and 80 psi. The filtrate was collected in a graduated cylinder and volume recorded as a function of time. Before each filter press test was performed, the unit was rinsed with distilled water. This washing was collected and used as a blank for metal analysis. To determine the filter cake solids concentration, the test was continued until a slight loss in the applied pressure occurred. At the completion of the test the filter pad was carefully removed from the filtering assembly, and total solids were determined on a weight basis.

FIGS. 26a-b, 27a-b, 28a-b, 29a-b, and 30a-b, show a general trend of increasing cake solids concentration with increasing pressure and $H_2O_2$ dosage in the pressure filtration tests. Sludge samples A and B (Norfolk), tabulated in FIGS. 26a and 27a, respectively, showed higher cake solids concentrations as compared to the other three samples.

FIG. 31 shows the specific resistance for the sludge samples from Norfolk (Sample B) and Chesapeake decreased with increasing pressure and $H_2O_2$ dose. Surprisingly, sludge samples from Newport News and Portsmouth (Samples C and D) showed increases in specific resistance with increasing pressure and $H_2O_2$ concentration.

In further experiments, cake solids determinations were made using a high speed Damon/IEC HT Centrifuge. In the experiments, a 40 ml sludge sample was poured into 50 ml round bottom centrifuge test tubes. The centrifuge tubes were then installed in a centrifuge rotor and runs were made at centrifuge speeds of 1000, 3000, and 5000 rpm. The centrifuge runs were made from one to three minutes residence time. The run duration resident time was measured from the time at which the centrifuge reached the desired rpm. Based on the dimensions of the centrifuge head and rotational speed of the rotor, the centrifugal forces were calculated. Following centrifugation, the centrate volume was measured by pouring it into a graduated cylinder. The difference in the initial poured volume and the final volume is the cake volume. The compacted solids were carefully scraped from the tube and placed in a preweighed aluminum pan for filtered solids determination.

FIGS. 32-36 discloses that low cake solids concentrations were obtained in the centrifuge tests as compared to the other dewatering processes. In general, the cake solids concentrations were found to increase slightly with increasing $H_2O_2$ concentration, spintime, and speed of the centrifuge. The low solids concentration could be associated with the batch type of operation employed.

FIGS. 37 to 41 shows the results for metal analysis of all the filtrates, e.g., the filtrates from sand bed filtration, vacuum filtration, and pressure filtration, as well as the supernatant from centrifugation tests. FIGS. 37 to 41 indicate that most of the aluminum, iron and manganese was retained in the cake solid residual. In all experiments for the four different residuals examined, aluminum and iron concentrations in the leachates were inversely correlated to the $H_2O_2$ dose added to the residual. The cause of the improved retention of metals at higher $H_2O_2$ concentrations was not determined but may be related to the oxidation of organic ligands since organic ligands that complex aluminum and iron have been shown to increase metal solubility. Since many metals of environmental concern readily complex with organics, the use of $H_2O_2$ appears to be a new method that may effectively minimize the residual solids from water treatment plants generating alum sludge and at the same time produce water released from the residual that is low in toxic heavy metals and consequently requires less costly or no additional treatment.

In order to establish an empirical relationship between the cake solids concentration (Ck), $H_2O_2$ dosage, applied pressure, and the initial solids concentration (Co) of a sludge, a multiple regression analysis was performed. From the experimental data, it was determined that cake solids concentration (Ck) could be expressed as a function of the hydrogen peroxide dose, applied pressure, and the initial solids concentration (Co) of the sludge sample by Equation 4:

$$Ck = f(H_2O_2, Pe, Co). \quad 4.$$

Using a SAS system program for statistical analysis, available from the SAS Institute, Inc. of Cary, N.C. (1985 version), a general equation was determined. These calculations were made using the NLIN (Non Linear Regression) and the GLM (General Linear Model) procedures. A separate empirical relationship was determined from vacuum filtration and pressure filtration results as indicated below in Equations 5 and 6:

Vacuum Filtration Test:

$$Ck_v = 19.45 + 0.224 \, Co \, [11.58 \, H^{0.324} + 0.757 \, P_v] \quad 5.$$

Pressure Filtration Test:

$$Ck_p = 17.63 + 0.224 \, Co \, [12.58 H^{0.333} + 0.152 \, P_p] \quad 6.$$

where, $Ck_v$ = Cake solids concentration obtained by vacuum filtration, percent.
$Ck_p$ = Cake solids concentration obtained by pressure filtration, percent.
Co = Initial solids concentration of sample, percent.
H = Hydrogen peroxide concentration, mg/l.
$P_v$ = Vacuum, inches of Hg.
$P_p$ = Applied pressure, psi.

The observed and the calculated values of Ck for both vacuum and pressure filtration tests are tabulated in FIGS. 14b, 15b, 16b, 17b, and 18b, and 26b, 27b, 28b, 29b, and 30b, respectively. The correlation factor (R-square) for both equations A and B was found to be 0.803 and 0.7711, respectively. The significance level of 0.0001 for the independent variables in both the models indicate that the independent variables, pressure, $H_2O_2$, and Co contribute significantly to the model.

While the invention has been described in terms of its preferred embodiment which comprises adding a quantity of $H_2O_2$ to an alum sludge sample prior to dewatering, those skilled in the art will recognize that the invention can be practiced with modification within the spirit and scope of the appended claims.

Having thus described my invention, what I claim as new and desire to secure by Letters Patent is as follows:

1. A method for enhancing the dewaterability of alum sludge, comprising the steps of:
    adding a quantity of hydrogen peroxide to a quantity of alum sludge;
    allowing said quantity of hydrogen peroxide to interact with said quantity of alum sludge; and
    dewatering said quantity of alum sludge, said hydrogen peroxide enhancing the amount of dewatering of said quantity of alum sludge over that which would be achieved without said quantity of hydrogen peroxide.

2. A method as recited in claim 1 wherein said quantity of hydrogen peroxide added during said adding step allows a final concentration for said alum sludge to range between two hundred and three hundred percent greater after dewatering when compared to alum sludge receiving no hydrogen peroxide and dewatered under identical conditions.

3. A method as recited in claim 1 wherein said quantity of hydrogen peroxide added during said adding step ranges between 2.5 milligrams per liter and 15 milligrams per liter.

4. A method as recited in claim 1 wherein said step of allowing said quantity of hydrogen peroxide to interact with said quantity of alum sludge includes the steps of mechanically mixing said hydrogen peroxide with said alum sludge to form a mixture and holding said mixture for a sufficient quantity of time prior to dewatering.

5. A method as recited in claim 1 wherein said step of dewatering is performed with a sand bed.

6. A method as recited in claim 1 wherein said step of dewatering is performed by filtration.

7. A method as recited in claim 6 wherein said filtration occurs under vacuum pressure.

8. A method as recited in claim 6 wherein said filtration occurs under applied pressure.

9. A method as recited in claim 1 wherein said step of dewatering is performed by centrifugation.

10. A method for enhancing the retention of metals in cake solids when dewatering alum sludge, comprising the steps of:
    adding a quantity of hydrogen peroxide to a quantity of alum sludge;
    allowing said quantity of hydrogen peroxide to interact with said quantity of alum sludge; and
    dewatering said quantity of alum sludge to produce a cake solid for disposal, said hydrogen peroxide enhancing the amount of metals retained in said cake solid upon dewatering said alum sludge over that which would be achieved without said quantity of hydrogen peroxide.

11. A method as recited in claim 10 wherein said quantity of hydrogen peroxide added during said adding step allows a final concentration for said alum sludge to range between two hundred and three hundred percent greater after dewatering when compared to alum sludge receiving no hydrogen peroxide and dewatered under identical conditions.

12. A method as recited in claim 10 wherein said quantity of hydrogen peroxide added during said adding step ranges between 2.5 milligrams per liter and 15 milligrams per liter.

13. A method as recited in claim 10 wherein said step of allowing said quantity of hydrogen peroxide to interact with said quantity of alum sludge includes the steps of mechanically mixing said hydrogen peroxide with said alum sludge to form a mixture and holding said mixture for a sufficient quantity of time prior to dewatering.

14. A method as recited in claim 10 wherein said step of dewatering is performed with a sand bed.

15. A method as recited in claim 10 wherein said step of dewatering is performed by filtration.

16. A method as recited in claim 15 wherein said filtration occurs under vacuum pressure.

17. A method as recited in claim 15 wherein said filtration occurs under applied pressure.

18. A method as recited in claim 10 wherein said step of dewatering is performed by centrifugation.

* * * * *